July 23, 1935.  T. B. FLANAGAN  2,009,020

SCALE

Filed Oct. 23, 1933  2 Sheets-Sheet 1

INVENTOR.
Thomas B. Flanagan.

BY
ATTORNEYS.

July 23, 1935.  T. B. FLANAGAN  2,009,020
SCALE
Filed Oct. 23, 1933  2 Sheets-Sheet 2

INVENTOR.
Thomas B. Flanagan.
BY
ATTORNEYS.

Patented July 23, 1935

2,009,020

UNITED STATES PATENT OFFICE 2,009,020

SCALE

Thomas B. Flanagan, Columbus, Ohio, assignor to The Exact Weight Scale Company, Columbus, Ohio, a corporation of Ohio Application October 23, 1933, Serial No. 694,771

14 Claims. (Cl. 265—58)

My invention relates to scales. It has to do more particularly with weighing scales wherein pivotally mounted beams are provided, which beams are adapted to be counter-weighted for the purpose of balancing the weight of objects or commodities placed on the scales and thereby indicating the weight of such objects or commodities. More specifically, it relates to that type of scale commonly known as a platform scale, although there are certain features of my invention not necessarily limited thereto.

Scales of the type indicated are usually built in such a manner that it is necessary to depend largely upon the skill of the operator in procuring accurate weighing. This is due mainly to the fact that in the ordinary scale of this type the movement of the beam is very limited and it is very difficult to determine when the beam is in a true state of balance. Consequently, it is very difficult to obtain accurate weighing and the weighing operation can not be performed very speedily, if performed accurately, the result being that the operator will either give away merchandise or give short weights, with resultant loss either to the seller or to the buyer. It is, therefore, important with scales of this type to have mechanism for readily indicating, in an accurate manner, to the operator when the beam is in a true state of balance, thereby eliminating guesswork and dependency on the skill of the operator.

One of the objects of my invention is to provide a scale of the type indicated having mechanism associated therewith for greatly multiplying the movements of the beam so that movement or positions of the beam either over or under a given position of balance may be read or determined with accuracy and convenience, thereby rendering the scale much more accurate and making the weighing operation much more easily and quickly performed.

Another object of my invention is to provide indicating mechanism which is adapted to indicate the position of the beam away from balance position and to indicate when it is in a true state of balance, such mechanism being of such a type that it may be readily attached to platform or scales of a similar type which are now commonly in use.

Another object of my invention is to provide mechanism adapted to be operatively connected to a beam of a scale of the type indicated, such mechanism including an indicator which will move in response to movement of the beam, but will greatly amplify movement of the beam, and such mechanism being of such a type as to cause the indicator to indicate gradually approach to balanced position from an underweight position, but which will move at a greater speed after it passes balance position to warn the operator of overweight conditions.

Another object of my invention is to provide indicating mechanism of the type described adapted to be associated with scales of the type indicated, such mechanism being foolproof, having a minimum amount of friction and being of such a type that there will be substantially no danger of the parts thereof binding.

Another object of my invention is to provide indicating mechanism of the type described adapted to be operatively connected to the beam of a scale of the type indicated, such mechanism having an indicator pointer which will move in a direction of movement corresponding to the direction of movement of the beam itself, but which will greatly multiply movement of the beam, so that the operator can readily determine position of the beam relative to a given point of balance by noting the position of the indicator with reference to the balance point on a chart with which it cooperates.

Another object of my invention is to provide an indicating attachment for scales of the type indicated adapted to indicate positions of the beam relative to a point of balance, such mechanism being very simple in construction and made up of a small number of parts and being inexpensive to manufacture.

Another object of my invention is to provide a scale of the type indicated wherein the indicating mechanism is adjustable to take care of varying tare weights, such adjustment being easily, quickly and accurately made.

In its preferred form, my invention contemplates the provision of indicating mechanism which is adapted to be operatively connected in a suitable manner to the beam of a scale of the type indicated. This mechanism, as previously stated, is adapted to indicate readily to the operator when the beam is in a true state of balance or its position relative to a balanced point. This mechanism includes a pivotally mounted pointer which is adapted to cooperate with a dial disposed in a readily visible location. The pointer is preferably disposed in superimposed relation to the beam and the beam and pointer preferably have their corresponding ends pivoted so that the pointer will move in a direction of movement corresponding to the direction of movement of the beam. The movement of the beam will be greatly amplified by the indicating mechanism and the mechanism is of such a type that, if the pointer reaches the balance point and passes over into the overweight area of the dial with which it cooperates, it will travel at a greater rate of speed, thereby warning the operator of overweight conditions.

The preferred embodiment of my invention is shown in the accompanying drawings wherein similar characters of reference designate corresponding parts and wherein.

Figure 1:
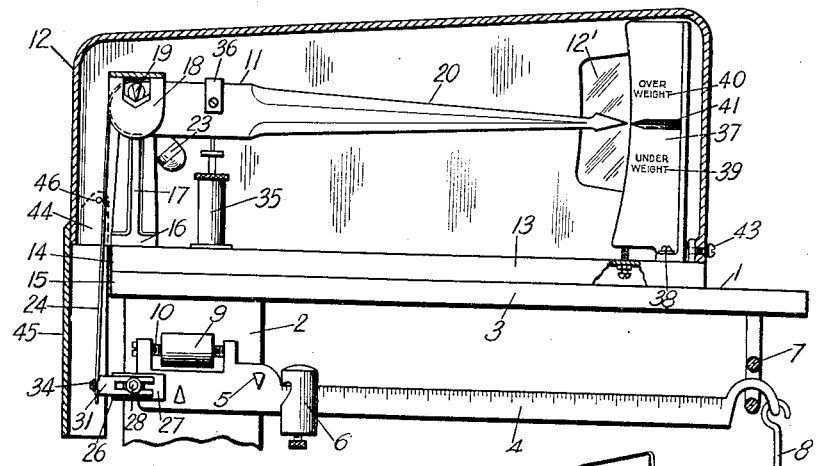
Figure 1 is a front elevation of a portion of a scale of the type indicated having mechanism, which is made in accordance with my invention, associated therewith and adapted to indicate positions of the beam relative to a given point of balance, the front part of the housing for the indicating mechanism being removed.
Figure 9:
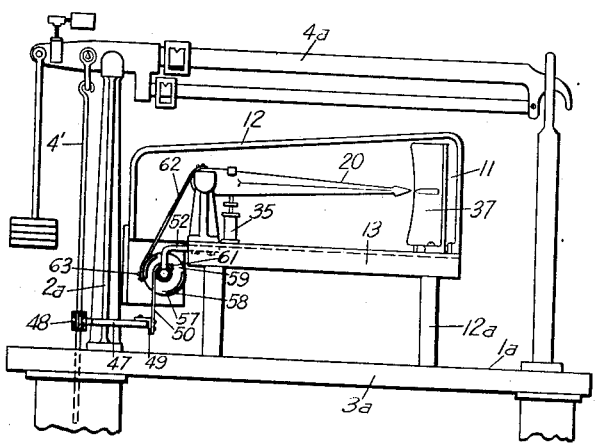

Figure 9 is a partially diagrammatic view showing the indicating mechanism attached to a scale wherein the beam thereof will occupy a position above the indicating mechanism, the indicating mechanism being operatively connected to the steelyard rod of the scale, rather than to the beam, as shown in Figure 1, and having mechanism associated therewith so that a slight movement of the steelyard rod will produce a comparatively great movement of the indicator pointer.

With reference to the drawings and, particularly to Figure 1 thereof, I have illustrated the upper portion 1 of a scale to which indicating mechanism of a type made in accordance with my invention is applied. In this figure, the upper end of the column 2 of the scale is shown and a column cap 3 is mounted on the extreme upper end thereof in a well known manner. A movable scale beam 4 is pivoted adjacent the upper end of the column 2 and the point at which the beam 4 is pivoted is indicated by the numeral 5. This scale structure is of a well known type of platform scale and the pivot 5 for the beam 4 may be of any well known type. The beam 4 has a weight 6 adjustable along the graduated surface thereof.

The outer end of the beam is adapted to operate in a trig loop 7 of conventional form which depends from the outer end of the column cap 3. The extreme outer end of the beam 4 has a counterpoise or weight pan 8 hanging therefrom. This weight pan 8 is preferably removable. The extreme inner end of the beam 4 is provided with a re-balancing weight 9 which is adjustable towards or from a pivot point 5 by screw mechanism 10. This mechanism may be used for re-balancing the scale, whenever necessary, in the well known manner. The inner end of the beam 4 is connected by suitable mechanism (not shown) to the platform mechanism of the scale.

This scale operates in a well known manner and is adapted to weigh articles placed on the platform thereof. In performing the weighing operation, weight is applied on the platform and the beam is counterweighted by the movable weight 6 and, in some instances, by weights placed on the pan 8. When the weight on the platform exactly offsets the weight applied to the beam, the beam will be in a true state of balance and the weight of the article placed on the platform will thereby be indicated. It will be apparent that movement of the outer end of the beam in the trig loop 7 will be very limited. Also, it will be very difficult to determine when the beam 4 is in a true state of balance. Consequently, unless mechanism is provided for multiplying the movements of the beam and for indicating when the beam is in a true state of balance, it is very difficult to perform accurately the weighing operation. It is necessary to rely on the skill of the operator in guessing when the beam is in a true state of balance.

In order to eliminate the guesswork in the weighing operation and to make the operation more easily performed, I have devised mechanism which will readily indicate to the operator at all times the position of the beam relative to a given point of balance and to indicate when the beam is in a true state of balance.

As shown in Figure 1 of the drawings, this mechanism comprises the indicating mechanism 11 which is disposed in a housing 12 which is preferably mounted on the top of the scale. This mechanism includes a supporting member 13 preferably of the shape shown in Figure 2. This supporting member 13 is preferably fastened by means of screws or in any other suitable way to the upper surface of the column cap 3. The left hand end 14 of this support 13 is preferably disposed flush with the left hand end 15 (Figure 1) of the column cap 3.

On the extreme left hand end of the supporting member 13 a standard 16 is bolted or otherwise secured. This standard has a pair of upwardly extending arms 17 with knife-edge bearings 18 of a suitable type on the upper ends thereof. These bearings 18 are adapted to receive the knife-edge trunnions 19 which are disposed on the inner end of an indicator pointer 20.

The indicator pointer 20 has its inner end rigidly secured by screws 21 or in any other suitable way to a small drum member 22. This drum member 22 is adapted to be disposed between the upper ends of the arms 17 of the standard 16 and carries the knife-edge trunnions 19. These trunnions 19 project from each side of the drum member 22 and, as previously stated, are adapted to extend into the knife-edge bearings 18. As shown in the drawings and, particularly in Figure 3, the knife-edge trunnions 19 are disposed eccentrically of the drum member 22. The trunnions are disposed in this manner for a purpose which will be hereinafter fully disclosed. The drum member 22 has a pendulum weight 23 projecting from the periphery thereof substantially in line with the trunnions 19 but on the opposite edge of the drum. This pendulum weight 23 is adapted to serve as the resistance element for the indicator 20.

It will be apparent that the indicator pointer 20 is mounted in superimposed relation to the beam 4. Also, the corresponding ends of the beam and pointer are pivotally mounted. The pointer 20 is comparatively long and, in this particular instance, is almost as long as the beam and is fulcrumed closely adjacent its end, as shown in Figure 1. The pointer 20 will swing up and down in a vertical plane and its movement will correspond to movement of the beam 4 with which it is connected, as will be more fully set out hereinafter. The movement of the beam will be amplified by the pointer 20, due mainly to the fact that the pointer is pivoted closely adjacent to one end thereof and is comparatively long. It is particularly advantageous having the pointer 20 arranged in a manner corresponding to the arrangement of the beam 4 and having it swing up and down in a manner similar to the swinging of the beam, but being multiplied, of course, to a considerable extent. By having the pointer disposed in this manner relative to the beam, the position of the beam may be more readily determined than if the pointer were mounted in such a manner as to swing from left to right instead of up and down, as in this instance, which up and down movement will correspond to the movement of the beam.

The means for connecting the indicator pointer 20 to the beam 4 will now be described in detail. This means comprises a metal tape 24 which has its extreme upper end clamped to the periphery of the drum 22 by a small clamp 25. This clamp 25 is disposed on the periphery of the drum 22 at a point spaced a short distance to the right around the drum from the point at which the trunnions 19 are located. This tape 24 passes downwardly around the drum 22 and its lower end is connected to the heel or inner end of the beam 4 by a novel clamp member 26. I connect the tape to the heel of the beam, rather than to the outer end of the beam because sidewise movement of the heel of the beam will be negligible while sidewise movement of the outer end of the beam might be considerable. Thus, there will be little or no danger of any of the parts binding, due to sidewise movement of the beam.

The clamp member 26 which I preferably use for connecting the tape to the beam comprises a pair of plate members 27 which are secured together substantially midway between their ends (Figures 6, 7 and 8) by means of a threaded bolt 28 passing through alining openings in plates 27, the opening in the left hand plate being threaded. The inner portions of the plates 27 are provided with indented surfaces 29 which are also preferably knurled or roughened. These surfaces 29 are adapted to be positioned in clamping relation to the beam 4. A second threaded bolt 30 is threaded into an opening in the other end of one of the plates 27 and extends in a direction opposite to that in which the bolt 28 extends. The inner end of this bolt is adapted to contact with the inner surface of the plate 27, other than the one in which it is mounted.

Figures 2, 3:
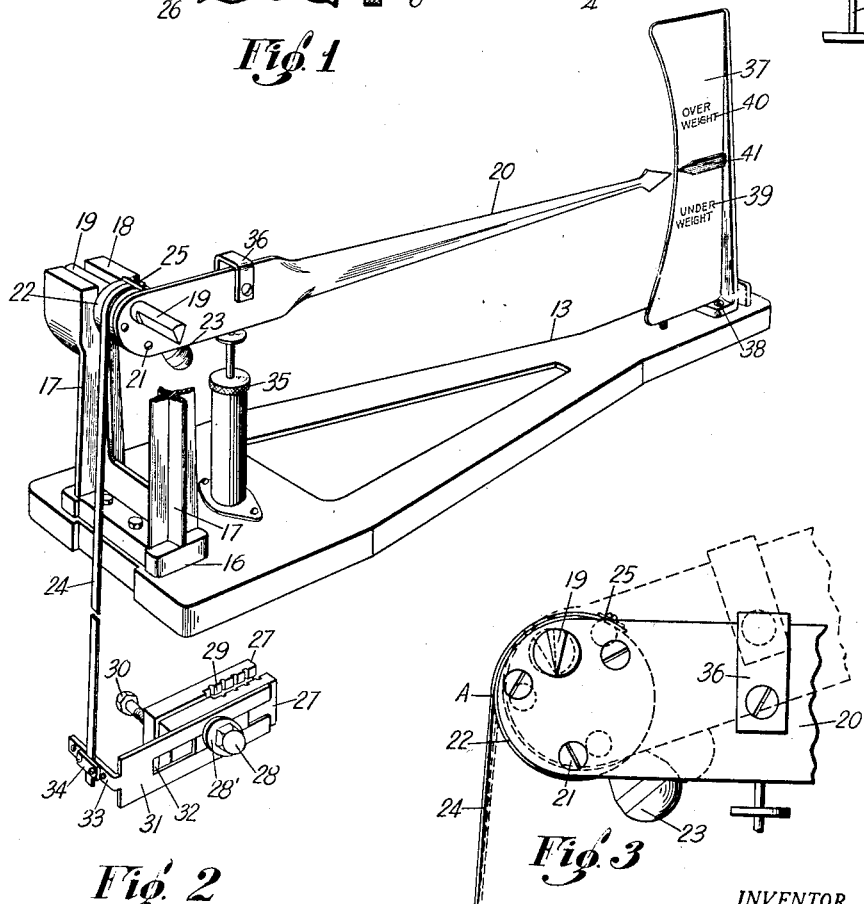
Figure 2 is a perspective view of the indicating mechanism made in accordance with my invention and adapted to be connected to the beam of the scale.
Figure 3 is an enlarged partially diagrammatic illustration of the inner portion of the indicator pointer showing the location of the pivot point and the manner in which the indicator will swing about this point.

A plate 31 is adapted to be clamped to the side of the plate 27 by means of the head of the bolt 28 and a washer 28'. This plate has an elongated slot 32 through which the bolt 28 is adapted to extend, (Figure 2). Thus, the plate 31 may be adjusted along the plate 27 as desired. The outer end of the plate 31 is provided with an arm 33 bent substantially at right angles thereto. This arm is adapted to be disposed in such a position that the tape may be extended down from the drum member 22 and be attached to this arm. A clamp 34, secured to the arm 33, may be employed for attaching the lower end of the tape thereto. This clamp 34 is attached to the arm 33 by means of screws passing through openings therein. The arm 33 is provided with several openings so that the member 34 may be moved along the arm to various positions, to vary the point of attachment of the tape to the arm 33, if desired.

Figure 6:
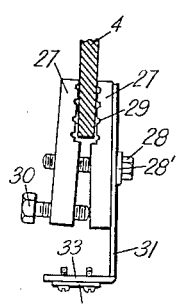
Figure 6 is a detail of a novel clamp which may be used for connecting the tape, adapted to operate the indicator, to the beam, the clamp being shown as clamped to the beam in a wrong way.
Figure 7:
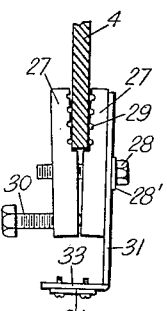
Figure 7 is a view similar to Figure 6 and showing the clamp clamped to the beam in another wrong way.
Figure 8:
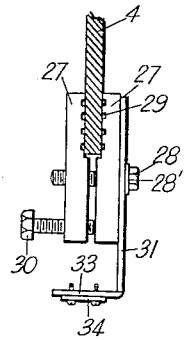
Figure 8 is a view similar to Figures 6 and 7 showing the correct manner for clamping the clamp to the beam.

The operation of this clamp will be understood from reference to Figures 6, 7 and 8. In Figures 6 and 7, I have shown the wrong ways for clamping the clamp on the beam. In Figure 8, the correct manner of applying the clamp to the beam is illustrated. From this figure, it will be seen that, when the clamp is applied to the beam, the bolts 28 and 30 should be adjusted in such a manner that the plates 27 will be parallel with each other. This will ensure that the surfaces 29 of the plates 27 will contact with the beam substantially throughout their area. Thus, a firm connection between the clamp and the beam will be provided. Although I prefer to use this form of clamp, it will be apparent that other means might be employed for connecting the lower end of the tape to the beam.

Thus, it will be apparent that movement of the beam will result in a corresponding movement of the indicator pointer 20. In order to dampen the movement of the indicator pointer 20, I provide a dashpot mechanism 35 of any well known type which is mounted below the pointer 20 adjacent its inner end and close to the point where it is pivoted. This dashpot mechanism is connected to the indicator pointer 20 by means of a bracket 36.

The indicator pointer 20 is adapted to cooperate with a dial 37 mounted adjacent its outer end. This dial is preferably made of metal and is secured to the upper surface of the supporting member 13 by means of screws 38 passing through lugs formed on the lower end thereof. This dial preferably has an underweight indication 39 thereon, an overweight indication 40 thereon and a balance point 41 thereon. Also, both sides of the dial are preferably provided with these indications. However, if desired, the dial 37 may be calibrated in any other manner. The dial 37 is preferably disposed in the same vertical plane as the indicator pointer 20 and the extreme end of the pointer almost contacts with the edge of the dial. The edge of the dial is arcuately shaped in order to prevent interference of the indicator with the dial when it swings.

The housing 12 is adapted to enclose the indicator 20 and its associated mechanism. This housing has a window 12' disposed in the rear wall thereof (Figure 1) and a similar window in the front wall thereof (not shown) so that the indicator and chart may be viewed either from the front or rear of the housing. The housing 12 is preferably made in one piece and is adapted to slip down over the indicating mechanism. Its lower edges are fastened to the supporting member 13 by means of the screws 43 or in any other suitable manner. The left hand end of the housing 12 (Figure 1) extends a slight distance past the end 14 of the support. This produces a space 44 down through which the metal tape 24 may pass. The left hand end of the housing is provided with a depending cover member 45 which is pivotally secured thereto as at 46. This cover 45 is adapted to cover the tape 24 and the clamp 26.

When the indicating mechanism is applied to a scale, it is mounted on the upper end thereof, as shown in Figure 1. The tape is then attached to the beam in a manner previously described. This tape may be of any desired length. As previously stated, this indicating mechanism may be applied to any of the scales now commonly in use.

At the time the tape is attached to the beam, both the beam and the indicator are moved to their lowermost positions. Then, it should be determined whether or not the swinging movement of the indicator will correspond to the movement of the beam. If it is found that it does not, then the connection of the tape to the beam may be varied until the movement of the beam substantially corresponds to movement of the indicator, that is, until the beam and indicator reach balance position substantially at the same time. The re-balancing mechanism 9 may be employed for bringing the indicator 20 into exact alignment with the balance point 41 on the dial when the beam 4 is properly balanced. When the indicating mechanism is attached to the scale in this manner and the proper adjustments made, the scale will then be ready for operation.

In the operation of this scale, the article placed on the platform will be weighed in the usual manner. However, movement of the beam will be amplified by movement of the pointer 20, due mainly to the fact that the indicator is pivoted closely adjacent one end and is comparatively long and because the pulling force of the tape 24 is exerted on the short arm thereof. The position of the beam relative to the balance point will be indicated to the operator at all times.

If the beam 4 is not in a true state of balance and there is insufficient weight on the platform, the indicator 20 will point to the underweight side of the dial. If weight is then added on the platform, this will cause the outer end of the beam to move upwardly and the heel of the beam to swing downwardly. Consequently, the tape 24 will be pulled downwardly. This will cause the drum 22 and indicator 20 to swing about its pivot and, consequently, cause an upward swinging movement of the indicator similar to the movement of the beam, though greatly multiplied. Thus, when the indicator finally reaches balance point, this will indicate that the beam is in a true state of balance. If too much weight is placed on the platform, the beam will move upwardly past its balance point and this will cause a corresponding upward swinging of the indicator past the balance point on the dial and into the overweight area thereof. The pendulum weight 23 will always serve to resist upward movement of the indicator.

This indicating mechanism is of such a type that, during the movement of the indicator from the underweight area of the dial, to the balance point 41 and past the balance point into the overweight area, it will travel at a gradually increasing speed so that by the time it passes into the overweight area it will be traveling at considerable speed thereby serving as a better warning to the operator that overweight conditions exist. It will be seen from Figure 3 that this is due to the fact that the drum 22, to which the indicator is fastened, is eccentrically mounted, due to the fact that the trunnions 19 which rest in the bearings 18 are eccentrically disposed thereon. From this figure it will be seen that, when a downward pull is exerted on the tape 24, it causes the drum to swing inwardly about its pivot point. This will move the point A, at which the force is applied to the periphery of the drum by the tape, to cause swinging thereof about its pivot, inwardly as shown by the dotted lines. In other words, the lever arm used for applying the pulling force from the tape to the indicator will be shortened as the indicator moves upwardly. Therefore, due to the shortening of this lever arm, the indicator pointer will be caused to swing at a greater rate of speed. The higher the indicator 20 is swung, the closer the point A will approach the pivot point of the drum 22, or, in other words, the shorter the lever arm used for applying the force to swing the drum and pointer will become. Thus, as the indicator pointer moves upwardly across the dial, it will travel at a higher rate of speed.

Figure 4:
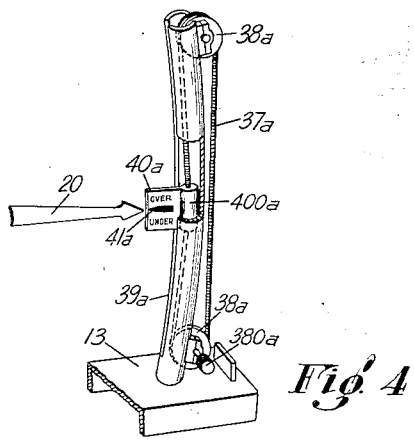
Figure 4 is an enlarged detail in perspective of the adjustable dial of the indicating mechanism which is adapted to take care of varying tare weights placed on the scale.

In Figure 4, I have shown an indicating mechanism which is particularly useful on scales which are adapted to weigh commodities contained in containers of varying weights, or, in other words, which is adapted to be used with scales when the tare weight might vary from time to time. This indicating mechanism is quickly, accurately and easily adjustable to take care of varying tare weights.

This mechanism embodies a dial or target 40a with which the indicator 20 is adapted to cooperate. This target preferably has over and under weight indications and is provided with a balance point 41a. The target preferably embodies a flat plate with a cylindrical portion 400a on its inner end. This portion 400a is adapted to slidably fit within an arcuate tubular member 39a. This tubular member has a slot in its side through which the target projects. The tubular member 39a is bent in an arc substantially corresponding to the arc of movement of the outer end of the pointer 20. The portion 400a of the target is connected to an endless member 37a which preferably comprises a coil spring. This member 37a passes around a pair of pulleys 38a through the tubular member 39a and one of which is disposed at the upper end and one at the lower end of the tubular member. The lower pulley is mounted on a shaft which extends through the indicator housing (not shown) and which is provided with a knurled knob 380a.

In the operation of this mechanism, suppose that a barrel or other empty container is placed on the scale and differs in weight from the last container of a similar type which was placed thereon. This would cause the indicator 20 to occupy a position which would not correspond to the balance point 41a on the target. To bring the pointer in line with the balance point, it will only be necessary to turn the knob 380a in the proper direction. This will move the target with the balance point in line with the indicator and then the container may be filled with the commodity and the weighing operation completed, using the newly acquired balance point.

When the target is moved, it will follow the curvature of the tubular member 39a and, consequently, will move in an arc corresponding to the arc of movement of the end of the indicator. This movement of the target will be permitted without binding in the tubular member, due to the fact that the endless member 37a is resilient.

It will be readily apparent that this mechanism may be very quickly adjusted to take care of varying tare weights or for any other similar purposes. In order to make it more clear just how the adjustable indicating mechanism can be used in taking care of variations in tare weight, I will cite the following example:

Suppose the commodity being weighed is to be placed in barrels, and these barrels weigh from a minimum of approximately nine pounds to a maximum of approximately thirteen pounds. The poise on the beam is set at the eleven-pound mark thereon, this allowing for a two-pound variation of the tare weight either way. When the empty barrel is placed on the platform of the scale, if it weighs over or under eleven pounds, the indicator will not align with the balance point 41a on the target. The knob 380a is then turned to move the target until the balance point thereof aligns with the indicator. It will be understood that during the above operations there will be no weights on the weight pan 8. Thereafter, the newly acquired balance point is used as the final balance point.

If the barrel is to be filled with, say, one hundred pounds of commodity, a one hundred-pound ratio weight will be placed on the weight pan 8 and the poise in the beam will be left at the eleven-pound mark. Then the barrel will be filled with the commodity until the indicator is exactly in alignment with the balance point on the target.

The barrel with the commodity therein is then removed. The one hundred-pound ratio weight is removed from the weight pan 8, but the poise on the beam is left at the eleven-pound mark. Then another empty barrel is placed on the platform of the scale and if it has a different weight than the one previously placed thereon the indicator will not align with the balance point 41a. The knob 380a will then be turned to move the target until the balance point thereof is in alignment with the indicator and thereafter the newly acquired balance point will be used as the final balance point.

With this scale, it is not necessary to adjust or touch any "live" element of the scale, such as the beam, in order to compensate for variations in tare weight. Therefore the balancing of the scale after the tare has been applied thereto is speeded up greatly. Of course, this mechanism might also be used merely for rebalancing the scale in case it becomes out of balance for any reason.

In Figure 9, I have shown a slightly different type of scale than that shown in Figures 1 and 4 to which the indicating mechanism of my invention may be attached. In this figure, the upper part of the scale is indicated by the reference character 1a and includes a horizontally disposed cap member 3a. This cap member has a supporting member 2a on the upper surface thereof, on the upper end of which a beam 4a is pivotally mounted. This beam is connected to the platform mechanism (not shown) by means of a steelyard rod 4'. It will be apparent that the beam is spaced a considerable distance above the cap 3a. Consequently, I place the indicating mechanism 11 on top of the cap 3a and below the beam. This mechanism is supported a considerable distance above the cap 3a by means of a supporting structure 12a.

In this figure, I have also illustrated a slightly different manner in which the indicating mechanism may be operatively connected to the beam 4a of the scale. The indicating mechanism 11 is exactly like that previously described and is mounted in a housing 12 as before. In this instance, however, I connect the tape which is used for operating the indicating mechanism directly to the steelyard rod 4' instead of to the beam 4a. The steelyard rod 4' operatively connects the heel of the beam 4a to the platform mechanism of the scale in a well known manner. I also provide means so that upon a slight vertical movement of the steelyard rod 4', a comparatively great movement will be imparted to the pointer 20.

In this figure, I have shown a bracket member 47 extending from the steelyard rod 4' to which it is clamped, by the clamping member 48 at the inner end thereof. This bracket member extends outwardly from the steelyard rod and its outer end has a member 49 secured thereon which is adapted to serve for adjustably attaching the lower end of a tape 50 thereto. The upper end of this tape 50 is attached to a multiple pulley 51, Figure 5, which is of such a type that only a slight movement of the steelyard rod 4' will produce a comparatively great movement of the indicator pointer 20.

Figure 5:
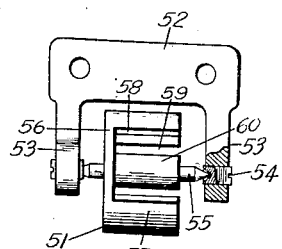
Figure 5 is a detail, partly broken away, of the multiple pulley which is illustrated in Figure 9 and which is adapted to produce a comparatively great movement of the indicator pointer in response to a slight movement of the steelyard rod.

This multiple pulley 51 is mounted on a bracket member 52 which is attached to the supporting member 13 of the mechanism on top of the scale. The bracket 52 projects outwardly from the left hand end of the support 13 a sufficient distance to permit rotation of the pulley 51. This bracket member 52 is provided with a pair of depending legs 53 having bearing members 54 adjustably mounted in the lower end thereof (Figure 5).

The multiple pulley 51 is provided with the trunnions 55 which are pointed and adapted to extend into the bearings 54. These bearings are located centrally of the multiple pulley. The multiple pulley comprises a disc-like body portion 56 having a flange 57 extending around its periphery. This flange 57 is cut away at diametrically spaced points 58 and 59 for a purpose which will appear later. The pulley further comprises a circular hub member 60 disposed concentrically with the flange 57.

The tape 50 passes up through the cutaway portion 58 of the flange and extends around the outer surface of the hub to which it is connected as at 61. The multiple pulley is so mounted that when the scale is in balance it will be positioned as shown in Figure 9. The purpose of the cutaway portion 58 is to permit extension of the tape past the flange 57 and around the hub 60. By having the flange cut away in this manner, the multiple pulley may be partially rotated without interference with the tape 59. The opposite side of the flange is cut away at 59 merely to balance the pulley. A second tape 62 is employed for connecting the multiple pulley to the drum member 22 to which the pointer 20 is attached. The lower end of this tape 62 passes around the outer surface of the flange 57 and is connected thereto as at 63.

As previously stated, the hub 60 of the multiple pulley is disposed concentrically with the flange 57. The hub is of considerably less diameter than the flange 57. Since the tape 50 passes around the hub, which is comparatively small in diameter, the lever arm for applying the force produced by pulling downwardly on the tape 50, to the multiple pulley to cause rotation thereof will be comparatively short. Consequently, only a slight pull will cause considerable rotation of the pulley as a whole. Also, due to the fact that the annular flange 57 is of comparatively great diameter, the lever arm for transmitting the rotative movement to a pulling movement on the tape 62, will be comparatively long. The circumference of the flange 57 will be considerably greater than that of the hub 60 so that it will be apparent that only a slight pulling movement on the tape 50 will result in pulling of the tape 62 through a considerable distance. Thus, only a slight movement of the steelyard rod 4' will result in a comparatively great swinging movement of the pointer 20.

It will be understood from the description above that I have provided a scale having many desirable features. The indicating mechanism which I have described is of such a type that it may be attached to any of the various types of scales of the type indicated now commonly in use. The indicating mechanism will indicate the position of the beam relative to the balance point at all times and will indicate when the beam is in a true state of balance. The movement of the beam will be greatly amplified so that the weighing operation may be performed very speedily and in an accurate manner.

Another advantageous feature of my invention is in the provision of a pointer which is so mounted that, after the beam reaches balance position and, consequently, the indicator reaches balance position and then, due to overweight conditions, passes balance position, the indicator will travel at a greater speed, thereby warning the operator of overweight conditions.

Another advantageous feature of my invention lies in the fact that the indicator pointer is superimposed with the movable beam, has its end pivoted which corresponds to the pivoted end of the beam, and is adapted to swing up and down in a direction of movement corresponding to that of the beam, which makes it possible for the operator to more readily determine the position of the beam relative to its balance point by comparison of the position of the indicator relative to the balance point on the dial with which it cooperates.

Another advantageous feature of my invention lies in the fact that a tape is used for connecting the beam to the indicator. This tape may be of any length necessary so that the indicating mechanism may be readily attached to various types of scales. Also, the tape is connected to the heel of the beam rather than to the outer end of the beam so that there will be substantially no danger of the parts binding, due to sidewise movement of the beam, which is at a minimum at the heel thereof.

Still another advantageous feature of my invention lies in the fact that it is substantially free of friction. The indicating mechanism is composed of a few parts, is very simple in structure and is practically fool-proof.

Many other advantages will be apparent from the preceding description, the drawings and the claims appended hereto.

Having thus described my invention, what I claim is:

1. In a scale of the type described, a movable beam, a movable pointer, a flexible connecting member attached to said pointer, means for attaching said connecting member to said beam, said means comprising a clamp to which said member is attached, said clamp comprising a pair of members adapted to be disposed in clamping relation to said beam, and means for ensuring that the clamping members will firmly clamp the beam, and including means for maintaining the clamping members in parallel relation to each other.

2. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer mounted to oscillate in a vertical plane, said pointer having one end attached to a drum member which is eccentrically fulcrumed, said pointer and said beam being superimposed relative to each other and the fulcrum points of said beam and said pointer being located adjacent the corresponding ends thereof, a pendulum weight carried by said drum member for resisting movement of said pointer in one direction, a chart with which the outer end of said pointer cooperates, said chart having an underweight indicating area and an overweight indicating area, means for operatively connecting said pointer to said beam in such a manner that the pointer will move in a direction corresponding to the direction of movement of the beam, said means comprising a flexible tape passing around the periphery of said drum member and being fastened thereto, the said tape being also connected to the short lever arm of the beam, and a dash-pot mechanism disposed beneath said indicator pointer adjacent the fulcrum point thereof.

3. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer mounted to oscillate in a vertical plane, said pointer having one end attached to a drum member which is eccentrically fulcrumed, said pointer and said beam being superimposed relative to each other and the fulcrum points of said beam and said pointer being located adjacent the corresponding ends thereof, a chart with which the outer end of said pointer cooperates, said chart having an underweight indicating area and an overweight indicating area, and means for operatively connecting said pointer to said beam in such a manner that the pointer will move in a direction corresponding to the direction of movement of the beam, said means comprising a flexible tape passing around the periphery of said drum member and being fastened thereto, the said tape being also connected to the short lever arm of the beam.

4. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer mounted to oscillate in a vertical plane, said pointer having one end attached to a fulcrumed drum member, said pointer and said beam being superimposed relative to each other and the fulcrum points of said beam and said pointer being located adjacent the corresponding ends thereof, a chart with which the outer end of said pointer cooperates, said chart having an underweight indicating area and an overweight indicating area, and means for operatively connecting said pointer to said beam in such a manner that the pointer will move in a direction corresponding to the direction of movement of the beam, said means comprising a flexible tape passing around the periphery of said drum member and being fastened thereto, the said tape being also connected to the short lever arm of the beam.

5. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer mounted to oscillate in a vertical plane, said pointer having one end attached to a fulcrumed drum member, said pointer and said beam being superimposed relative to each other and the fulcrum points of said beam and said pointer being located adjacent the corresponding ends thereof, and means for operatively connecting said pointer to said beam in such a manner that the pointer will move in a direction corresponding to the direction of movement of the beam, said means comprising a flexible tape passing around the periphery of said drum member and being fastened thereto, the said tape being also connected to the short lever arm of the beam.

6. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer fulcrumed to oscillate in a vertical plane, said pointer being fulcrumed adjacent one end thereof so as to produce lever arms of unequal lengths, said pointer and said beam being superimposed relative to each other and the fulcrum points of said beam and said pointer being located adjacent the corresponding ends thereof, a chart with which the outer end of said pointer cooperates, said chart having an underweight indicating area and an overweight indicating area, means for operatively connecting the short lever arms of said beam and said pointer together in such a manner that the long lever arms thereof will oscillate up and down in corresponding directions, and means for causing the pointer to move across said chart at varying rates of speed.

7. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer fulcrumed to oscillate in a vertical plane, said pointer being fulcrumed adjacent one end thereof so as to produce lever arms of unequal lengths, said pointer and said beam being superimposed relative to each other and the fulcrum points of said beam and said pointer being located adjacent the corresponding ends thereof, a chart with which the outer end of said pointer cooperates, said chart having an underweight indicating area and an overweight indicating area, and means for operatively connecting the short lever arms of said beam and said pointer together in such a manner that the long lever arms thereof will oscillate up and down in corresponding directions.

8. In a scale of the type described, a movable beam furcrumed to oscillate in a vertical plane to and from balanced position, said beam being fulcrumed adjacent one end thereof so as to produce lever arms of unequal lengths, means for multiplying movement of said beam and including a pointer mounted to oscillate in a vertical plane, said pointer having one end attached to a drum member which is eccentrically fulcrumed, said pointer and said beam being superimposed relative to each other and the fulcrum points of said beam and said pointer being located adjacent the corresponding ends thereof, a chart with which the outer end of said pointer cooperates, said chart having an underweight indicating area and an overweight indicating area, means for operatively connecting said pointer to said beam in such a manner that the pointer will move in a direction corresponding to the direction of movement of the beam, said means comprising a flexible tape passing around the periphery of said drum member and being fastened thereto, the opposite end of said tape being connected to the periphery of the outer portion of a multiple pulley rotatably mounted, and a second tape connected to the periphery of the inner portion of said multiple pulley, said second tape having its opposite end connected to a steelyard rod which is connected to said beam.

9. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer mounted to oscillate in a vertical plane, said pointer having one end attached to a fulcrumed drum member, said pointer and said beam being superimposed relative to each other and the fulcrum points of said beam and said pointer being located adjacent the corresponding ends thereof, a chart with which the outer end of said pointer cooperates, said chart having an underweight indicating area and an overweight indicating area, and means for operatively connecting said pointer to said beam in such a manner that the pointer will move in a direction corresponding to the direction of movement of the beam, said means comprising a flexible tape passing around the periphery of said drum member and being fastened thereto, the tape being also connected to said beam member, and a multiple pulley interposed in said connecting tape.

10. In a scale of the type described, a movable beam fulcrumed to oscillate in a vertical plane to and from balanced position, said beam being fulcrumed adjacent one end thereof so as to produce lever arms of unequal lengths, means for multiplying movement of said beam and including a pointer mounted to oscillate in a vertical plane, said pointer having one end attached to a drum member which is eccentrically fulcrumed, said pointer and said beam being superimposed relative to each other and the fulcrum points of said beam and said pointer being located adjacent the corresponding ends thereof, a chart with which the outer end of said pointer cooperates, said chart having an underweight indicating area and an overweight indicating area, the balance point of said chart being adjustable to compensate for variations in the weight, and means for operatively connecting said pointer to said beam in such a manner that the pointer will move in a direction corresponding to the direction of movement of the beam, said means comprising a flexible tape passing around the periphery of said drum member and being fastened thereto, the said tape being also connected to the short lever arm of the beam.

11. In a scale of the type described, a movable beam, a movable pointer, a flexible connecting member attached to said pointer, means for attaching said connecting member to said beam, said means comprising a clamp to which said member is attached, said clamp comprising a pair of members adapted to be disposed in clamping relation to said beam, and means for ensuring that the clamping members will firmly clamp the beam and including means for maintaining the clamping members in parallel relation to each other, and means for attaching the flexible member to said clamp, said last-named means being adjustable on said clamp.

12. In a scale structure, a beam, means for applying a selected weight to one end of the beam, means for applying the weight of a commodity to the other end of the beam, an over and under weight indicating mechanism comprising an over and under weight chart, an indicator mounted in cooperative relation to said chart, said indicator comprising a short arm and a long arm with the long arm disposed in cooperative relation to said chart and said indicator being an unbalanced member, and means for directly connecting the short arm of said indicator to one end of said beam so that the indicator is balanced by said beam to initially locate it in predetermined position upon said chart and so that its long arm is given an exaggerated movement by the movement of said beam.

13. In a scale structure, an unbalanced beam, means for applying a selected weight to one end of the beam, means for applying the weight of a commodity to the other end of the beam, an over and under weight indicating mechanism comprising an over and under weight chart, an indicator mounted in cooperative relation to said chart, said indicator comprising a short arm and a long arm with the long arm disposed in cooperative relation to said chart and said indicator being an unbalanced member, and means for directly connecting the short arm of said indicator to the short end of said beam so that the indicator is balanced by said beam to initially locate it in predetermined position upon said chart and so that its long arm is given an exaggerated movement by the movement of said beam.

14. In a scale structure, an unbalanced beam, means for applying a selected weight to one end of the beam, means for applying the weight of a commodity to the other end of the beam, an over and under weight indicating mechanism comprising an over and under weight chart, an indicator mounted in cooperative relation to said chart, said indicator comprising a short arm and a long arm with the long arm disposed in cooperative relation to said chart and said indicator being an unbalanced member, and means for directly connecting the short arm of said indicator to the short end of said beam so that the indicator is balanced by said beam to initially locate it in predetermined position upon said chart and so that its long arm is given an exaggerated movement by the movement of said beam, said last-named means being such that it will progressively increase the speed of travel of the indicator as it moves towards and into the over weight zone.

THOMAS B. FLANAGAN.